Feb. 2, 1932. G. A. HASSELER 1,843,223
KNIFE
Filed May 20, 1930
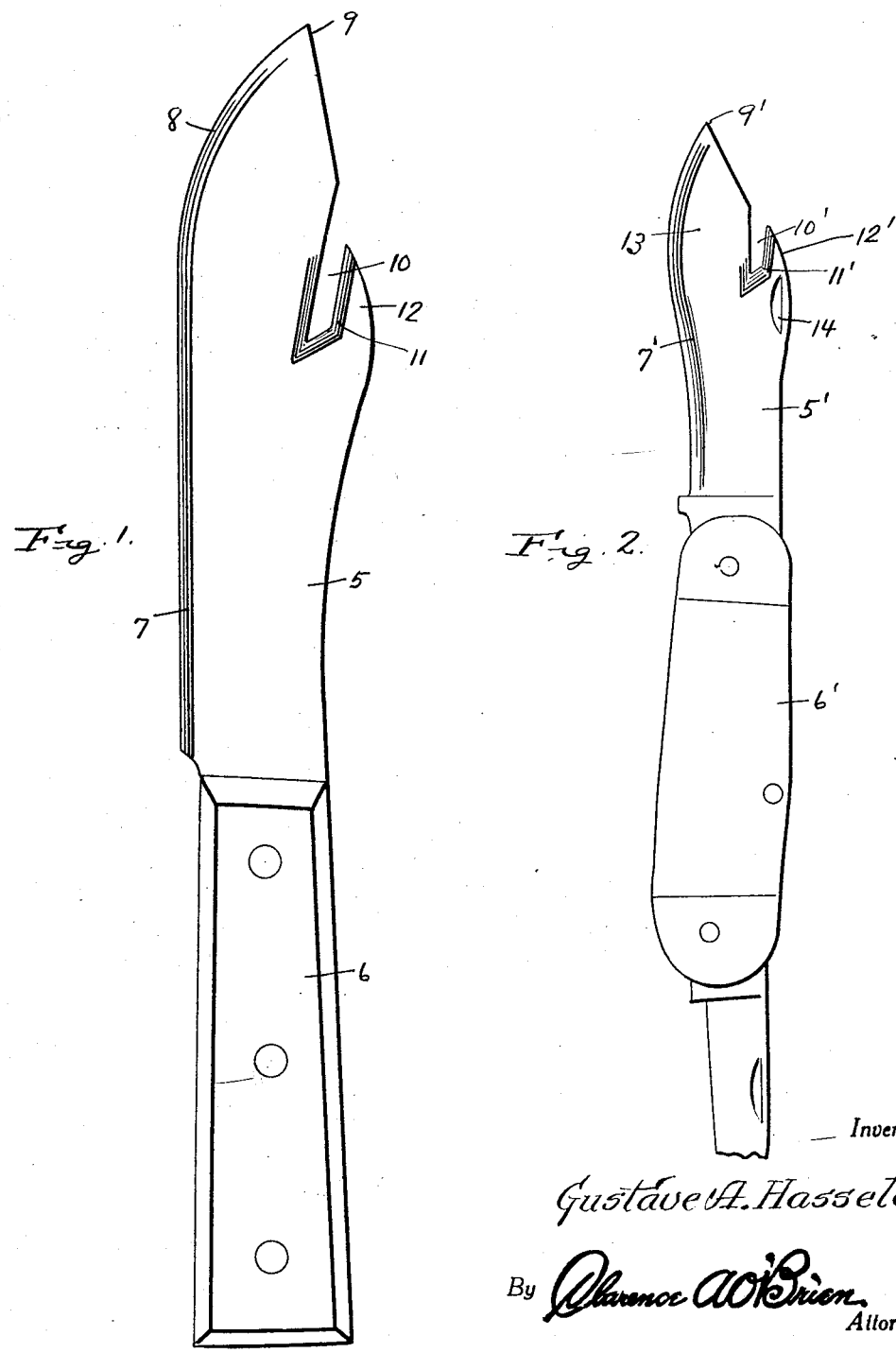
Inventor
Gustave A. Hasseler
By Clarence A. O'Brien
Attorney Patented Feb. 2, 1932

1,843,223

UNITED STATES PATENT OFFICE

GUSTAVE A. HASSELER, OF ARPIN, WISCONSIN

KNIFE

Application filed May 20, 1930. Serial No. 454,062.

This invention relates to certain new and useful improvements in knives, and has more particular reference to a blade therefor.

A primary object of this invention is to provide a blade for use in conjunction with a suitable handle to provide a butcher knife, the blade on a reduced scale being also adapted for use as forming one part of a pocket knife.

A still further object of the invention is to provide a blade for use in manner above referred to especially adapted for "butchering" or carving, the same being especially useful for hunters, butchers and the like.

Other objects and advantages of the invention will become apparent during a study of the following description, taken in connection with the accompanying drawings, wherein:

Figure 1 is an elevational view of my improved blade to be used as a butcher knife, Figure 2 is a similar view of the blade on a reduced scale for use as a part of a pocket knife.

With reference more in detail to the drawings, and particularly to Figure 1 it will be seen that the knife therein illustrated is in the nature of a butcher knife including a suitable blade 5 and a handle 6. The blade 5 according to the present invention has a sharpened edge 7 rounded at the forward or pointed end as at 8. The knife 5 at its forward end is suitably shaped to provide a penetrating point 9. The other edge of the blade 5 is blunt, and inwardly from its point 9 the blade 5 is provided with a notch 10 opening inwardly from the blunt edge of the blade 5 and extending in the direction of the length of the blade toward the handle 6.

The blade 5 along the sides and inner end of the notch 10 is sharpened as at 11. It will be also noted that the blade 5 at its blunt edge and adjacent the notch 10 is wider than at either end of the blade and the wide portion of the blade at the blunt edge thereof curves toward the open end of the notch 10 thus providing as it were on the blade 5 an auxiliary relatively small lateral slitting blade 12.

The advantage of a blade of the character comprehended by the present invention, is that the blade proper will act as a guide and a support for the small blade 12 while sliding the small blade 12 along under the skin of the animal being carved for the purpose of slitting the skin with the blade 12 during the carving. Thus the splitting of the skin is accomplished by pushing the blade away from the user, minimizing the possibility of injury to the user.

The knife will be found especially serviceable when carving around the legs and head of the animal as one may readily manipulate the handle 6 for guiding the blade. Furthermore, the small blade 12 can not be dulled by contact with the bones of the animal as the smaller blade during cutting or slitting of the hide, will always have its sharpened edge away from the bone or bones of the animal. The knife shown in Figure 1 is especially adaptable for carving or butchering large animals.

In Figure 2 I have shown another form of blade greatly resembling the blade 5. In this form of the invention, the blade is designated by the reference character 5' and is adapted to be suitably pivoted to the handle 6' of a pocket knife. The blade 5' is of course adapted to be moved into and out of the handle 6' in the usual manner. The blade 5' has its cutting edge 7' of irregular contour, the blade 5' at its forward end being slightly offset as at 13.

The blade 5' at its forward end is also pointed to provide a penetrating point 9'. In the same manner as the blade 5, the blade 5' is provided with a notch 10', the edges of the blade 5' about the notch being sharpened as at 11'. It will be also noted that the blade 5' adjacent the notch is of greater width than at either end of the blade thus forming a relatively smaller lateral blade 12' similar to the blade 12 of the knife blade 5.

It is apparent that the use of the blade 5' and its advantages are substantially the same as that set forth in regard to the blade 5. The blade 5' adjacent the small blade 12' is provided with a suitable moon shaped recess 14 to facilitate the drawing of the blade 5' from the handle 6' in a manner well known in the art.

Even though I have herein shown and described the preferred embodiment of my invention, it is to be understood that the same is susceptible to changes fully comprehended by the spirit of the invention as herein described, and the scope of the appended claim.

Having thus described my invention, what I claim as new is:

A knife comprising in combination a blade, having a relatively wide intermediate portion and tapering toward its end, said blade at the wide portion thereof provided with a notch elongated longitudinally, said blade having the opposite edges thereof defining the sides of the notch extending substantially parallel to one another and sharpened to provide oppositely disposed cutting edges, and said blade at the inner end of the notch having a straight edge forming the end of the notch and sharpened to provide an additional cutting edge extending substantially oblique with respect to the longitudinal axis of the blade.

In testimony whereof I affix my signature.

GUSTAVE A. HASSELER.